US006797308B2

(12) United States Patent
Pasch et al.

(10) Patent No.: US 6,797,308 B2
(45) Date of Patent: Sep. 28, 2004

(54) STABILIZATION OF COOKED PASTA COMPOSITIONS USING WHEY FROM NISIN-PRODUCING CULTURES

(75) Inventors: John Howard Pasch, Lake Zurich, IL (US); Michael Gerard Roman, Grayslake, IL (US); Scott Brooks, Des Plaines, IL (US); James L. Bell, Evanston, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 34 days.

(21) Appl. No.: 09/779,756

(22) Filed: Feb. 8, 2001

(65) Prior Publication Data

US 2002/0150660 A1 Oct. 17, 2002

(51) Int. Cl.$^7$ .............................................. A23L 1/162
(52) U.S. Cl. ...................... 426/557; 426/321; 426/326
(58) Field of Search ................................ 426/326, 557, 426/321, 325

(56) References Cited

U.S. PATENT DOCUMENTS

| | | |
|---|---|---|
| 3,093,551 A | 6/1963 | Hall |
| 3,616,255 A | 10/1971 | Nakagawa |
| 4,584,199 A | 4/1986 | Taylor |
| 4,597,972 A | 7/1986 | Taylor |
| 4,716,115 A | 12/1987 | Gonzalez et al. |
| 4,740,593 A | 4/1988 | Gonzalez et al. |
| 4,906,573 A | 3/1990 | Barney et al. |
| 5,231,165 A | 7/1993 | Vedamuthu et al. |
| 5,445,835 A | 8/1995 | Vedamuthu |
| 5,484,909 A | 1/1996 | Nietupski et al. |
| 5,527,505 A | 6/1996 | Yamauchi et al. |
| 5,594,103 A | 1/1997 | De Vos et al. |
| 5,705,339 A | 1/1998 | Nietupski et al. |
| 5,716,811 A | 2/1998 | Nauth et al. |
| 5,877,272 A | 3/1999 | Vandenbergh et al. |
| 5,895,680 A | 4/1999 | Cirigliano et al. |
| 5,914,248 A | 6/1999 | Kuipers et al. |
| 5,928,946 A | 7/1999 | De Vos et al. |
| 5,972,617 A | 10/1999 | Sami |
| 6,001,405 A * | 12/1999 | Bajracharya et al. ....... 426/325 |
| 6,110,509 A | 8/2000 | Nauth et al. |
| 6,113,954 A | 9/2000 | Nauth et al. |
| 6,136,351 A | 10/2000 | Nauth |

FOREIGN PATENT DOCUMENTS

| | | |
|---|---|---|
| EP | 0 186 498 A2 | 2/1986 |
| GB | 844782 | 8/1960 |
| RU | 507055 | 2/1979 |
| RU | 2059716 | 5/1996 |

OTHER PUBLICATIONS

Chung et al., "Effects of Nisin on Grown of Bacteria Attached to Meat", *Applied and Environmental Microbiology*, Jun. 1989, pp. 1329–1333.

Maas et al., "Sodium Lactate Delays Toxin Production by *Clostridium botulinum* in Cook–in–Bag Turkey Products", *Applied and Environmental Microbiology*, Sep. 1989, pp. 2226–2229.

Kosikowski, Frank, "Bakers', Neufchatel, and Cream Cheese", *Cheese and Fermented Milk Foods*, 2d 1977, p. 167.

Fowler, G. G. , "La Conservation Des Produits Alimentaires Au Moyen de la Nisine" Revue Des Fermentations et Des Industries Alimentaires, vol. 34, No. 5, 1979, pp. 157–159.

Delves–Broughton, J., "NISIN and Its Uses as a Food Preservative", Food Technology, vol. 44, No. 11, 1990.

Bell, R. G. et al., "The effect of nisin–sodium chloride interactions on the outgrowth of *bacillus licheniformis* spores", Journal of Applied Bacteriology, vol. 159, 1985, pp. 127–132.

Buncic, S. et al., "Individual and Combined Listericidal Effects of Sodium Lactate, Potassium Sorbate, Nisin and Curing Salts at Refrigeration Temperature", Journal of Food Safety, vol. 15, No. 2, 1995, pp. 247–264.

Nykanen, Anne, et al., "The Effect of Lactic Acid, Nisin Whey Permeate, Sodium Chloride and Related Combinations on Aerobic Plate Count and the Sensory Characteristics of Rainbow Trout", Lebensmittel Wissenschaft Und Technologie, vol. 31, No. 3, 1998, pp. 286–290.

Nykanen, A., et al., "Synergistic antimicrobial effect of nisin whey permeate and lactic acid on microbes isolated from fish", Letters in Applied Microbiology 1998, 27, 345–458.

Nykanen, A., et al., "Synergistic inhibition of Listeria monocytogenes on cold–smoked rainbow trout by nisin and sodium lactate", International Journal of Food Microbiology, 61 (2000) pp. 63–72.

Hurst, A., "Nisin", Advances in Applied Microbiology, vol. 27, pp. 85–1234.

Lucke et al., "Ecology and Control Foods", (A. H.W. Hauschild and K. L. Dodds, eds.) Marcel Dekker, New York, 1993, pp. 177–207. (Not current available).

(List continued on next page.)

Primary Examiner—Lien Tran
(74) Attorney, Agent, or Firm—Fitch, Even, Tabin & Flannery (57) ABSTRACT

The present invention provides fully cooked, ready to heat and serve pasta compositions which are stabilized against the development of toxins from pathogenic bacterial contaminants under refrigeration conditions for 120 days or more. The stabilized pasta compositions are attained by the incorporation of nisin-containing cultured whey derived from a nisin-producing culture. The pasta of the present invention is prepared from pasta dough comprising about 55 to about 80 percent high protein wheat flour, about 1 to about 5 percent wheat gluten, 0 to about 20 percent egg product, 0 to about 3 percent dough conditioner, sufficient nisin-containing cultured whey to provide about 200 to about 1200 IU nisin/g pasta dough, and sufficient water to provide a total moisture content of about 25 to about 35 percent.

30 Claims, 3 Drawing Sheets

OTHER PUBLICATIONS

Kalra, M.S, et al., "Stoppage in Increase in Acid Production of Yogurt by Incorporating a Nisin–Producing Culture", Division of Microbiology, National Dairy Research Institute, Karnal (Haryana) , Jul. 18, 1974, pp. 71–72.

Smart et al., *J. Appl. Bacteriol.*, 46, pp. 377–383 (1979).

Roberts et al., *J. Food Technol*, 14, 211–226 (1979).

Tompkin, *Food Technology*, 34, pp. 229–236, and 257 (1980).

Bryan et al., Amer Public Health, 61, pp. 1869–1885 (1971) (Not currently available).

Microbial Ecology of Food Commodities—Microorganisms in Foods 6: Blackie Academic and Professional, 1998, p. 115 (not currently available).

Kalra et al., Indian Journal of Dairy Science, 28: 71–72 (1975).

Bayoumi, Chem. Mikrobiol. Technol. Lebensm, 13:65–69 (1991).

Gupta et al., Cultured Dairy Products Journal, 23: 9–10 (1989).

Hogarty et al., J. Food Prot. 45:1208–1211 (1982).

Sadovski et al., XX International Dairy Congress, vol. E, 542–544, 1978 (not currently available).

Muriana et al., J. Food Protection, 58: pp. 1109–1113 (1995).

Brochure — "Specialty Wheat Protein Ingredients for Pasta and Noodle Products", Midwest Grain Products, Inc.

Brochure — "Specialty Wheat Proteins for Food Applications", Midwest Grain Products, Inc.

Brochure — "P$^2$ Pasta Power" —Midwest Grain Products, Inc.

Debbeouz, A., "Comparison of Semolina Fortification With Wheat Glutens and Egg White", North Dakota State University Cereal Science Department, Fargo, North Dakota, Oct. 15, 1996.

Brochure — "Creating Better Solutions Naturally" —Midwest Grain Products, Inc.

Microbial Ecology of Food Commodities—Microorganisms in Foods 6: Blackie Academic and Professional, 1998, pp. 112–115.

Gupta et al., Cultured Dairy Products Journal, 24: pp. 9–10 (1989).

\* cited by examiner

STABILIZATION OF COOKED PASTA COMPOSITIONS USING WHEY FROM NISIN-PRODUCING CULTURES

FIELD OF THE INVENTION

This invention relates to stabilization of cooked pasta compositions against the development of toxins from pathogenic bacterial contaminants. The stabilized pasta compositions are attained by the incorporation of nisin-containing cultured whey derived from a nisin-producing culture. The cooked pasta compositions of this invention, which include both filled and unfilled pasta compositions, are stable at refrigeration temperatures for 90 days or longer, and preferably for 120 days or longer, and require no further cooking (i.e., the pasta is fully hydrated and only requires warming before serving).

BACKGROUND OF THE INVENTION

Pasta products are generally shaped dried doughs made from durum or wheat flour mixed with water and, sometimes, eggs and/or milk. Pasta products are generally available as fully dried (generally about 10 percent or less moisture) or refrigerated (generally about 30 percent or less moisture) products.

Such products should, of course, be prepared free of pathogenic organisms, especially toxin-producing anaerobes. Pathogenic organisms that may contaminate food products include, by way of nonlimiting example, *Clostridium botulinum, C. perfringens*, (Lucke et al., in "Ecology and Control Foods" (A. H. W. Hauschild and K. L. Dodds, eds.) Marcel Dekker, New York, 1993, pp. 177–207; Smart et al., J. Appl. Bacteriol. 46, 377–383 (1979); Roberts et al., J. Fd. Technol., 14, 211–226 (1979); Tompkin, Food Technology, 34, 229–236, and 257 (1980); Bryan et al., Amer. Public Health, 61, 1869–1885 (1971); Microbial Ecology of Food Commodities—Microorganisms in Foods 6: Blackie Academic and Professional, 1998, p. 115), *Listeria monocytogenes, Escherichia coli, Bacillus cereus, Enterococcus faecalis*, and similar microorganisms. Among these, spore-forming, toxin-producing microorganisms are of particular concern, because any spores produced by viable cells may survive and grow to produce toxins subsequent to manufacturing or domestic heating steps. Such microorganisms include species of the genus Clostridium.

Conventional fully dried pasta products (i.e., dried pasta with about 10 or less percent moisture) are generally stable with regard to such microorganisms when stored at ambient temperatures. Refrigerated pastas are available both unfilled and filled. For refrigerated pastas, the moisture content is maintained at about 30 percent or less in order to control microorganisms. Generally such unfilled refrigerated pastas are stable for up to about 150 days at refrigeration temperatures; refrigerated pastas filled with a high moisture filling generally have shorted shelf lives (generally less than about 120 days at refrigeration temperatures). Both fully dried and refrigerated pasta must be cooked in boiling water to fully hydrate (i.e., increase moisture content up to about 50 percent) the pasta prior to consumption.

Nisin is a peptide-like antibacterial substance produced by microorganisms such as *Lactococcus lactis* subsp. *lactis* (formerly known as *Streptococcus lactis*). Its structure is illustrated in U.S. Pat. No. 5,527,505 to Yamauchi et al. The highest activity preparations of nisin contain about 40 million International Units (IU) per gram. Commercial preparations of nisin are available. For example, one commercial preparation, NISAPLIN™ containing about 1 million IU per gram is available from Aplin & Barrett Ltd., Trowbridge, England; another commercial preparation, CHRISIN™, containing about 1 million IU per gram is available from Chr. Hanson A/S (Denmark). Nisin has no known toxic effects in humans. It is widely used in a variety of prepared dairy foods. Experimental use in preserving other foods has also been reported. Details on these applications are provided below.

A number of efforts have been reported since 1975 directed to reducing uncoupled acid production in dairy fermentations by controlling the post-fermentation acidification of yogurt. In some of these studies, a nisin producing culture was introduced in an attempt to inhibit these effects. Kalra et al. (Indian Journal of Dairy Science, 28: 71–72 (1975)) incorporated the nisin producing culture *Streptococcus lactis* (now known as *L. lactis* subsp. *lactis*) along with the yogurt culture before fermentation. Others introduced nisin in milk prior to fermentation (Bayoumi, Chem. Mikrobiol. Technol. Lebensm., 13:65–69 (1991)) or following fermentation (Gupta et al., Cultured Dairy Products Journal, 23: 17–18 (1988); Gupta et al., Cultured Dairy Products Journal, 23: 9–10 (1989)). In all cases, the rate of post-fermentation acidification was only partially inhibited by these treatments and the yogurt continued to become more acidic throughout its shelf life.

In U.S. Pat. No. 5,527,505, yogurt was produced from raw milk by incorporating a nisin-producing strain, *Lactococcus lactis* subsp. *lactis*, along with the traditional yogurt culture consisting of *Streptococcus salivarius* subsp. *thermophilus* (ST) and *Lactobacillus delbrueckii* subsp. *bulgaricus* (LB). This patent teaches that the lactococci are needed to secrete the nisin, whose effect is to retard the activity of ST and LB. The resulting yogurt therefore contains the lactococci used to produce the nisin. Nonetheless, the acidity of yogurt containing the nisin-producing bacteria increased by 64 to 96 percent in 14 days in various experiments inoculated with differing amounts of *L. lactis* subsp. *lactis*, compared to the initial acidity at the completion of fermentation. Other studies (Hogarty et al., J. Fd. Prot., 45:1208–1211 (1982); Sadovski et al., XX International Dairy Congress, Vol. E: 542-5-44 (1978)) also noted acid production and development of bitterness at low temperature by some mesophilic starter lactococci in dairy products.

In U.S. Pat. No. 5,015,487, the use of nisin, as a representative of the class of lanthionine bacteriocins, to control undesirable microorganisms in heat processed meats is disclosed. In tests involving dipping frankfurters in nisin solutions, the growth of *L. monocytogenes* was effectively inhibited upon storage at 40° F.

Chung et al. (Appl. Envir. Microbiol., 55, 1329–1333 (1989)) report that nisin has an inhibitory effect on gram-positive bacteria, such as *L. monocytogenes, Staphylococcus aureus*, and *Streptococcus lactis*, but has no such effect on gram-negative bacteria such as *Serratia marcescens, Salmonella typhimurium*, and *Pseudomonas aeruginosa* when these microorganisms are attached to meat.

Nisin has been added to cheeses to inhibit toxin production by *Clostridium botulinum* (U.S. Pat. No. 4,584,199). This patent discloses a detailed example in which chicken frankfurter components are shown to require the presence of both added nitrite and added nisin in order to prevent or delay botulinum toxin production when challenged with *C. botulinum*.

Nisaplin™ has been found to preserve salad dressings from microbiological contamination, such as challenge by

*Lactobacillus brevis* subsp. *lindneri*, for an extended shelf life period (Muriana et al., J. Food Protection, 58:1109–1113 (1995)).

More recently, whey from nisin-producing cultures has been used to preserve and stabilize food compositions, including fermented dairy products, mayonnaise-type spreads, cream cheese products, meat compositions, and meat/vegetable compositions. These uses of whey from nisin-producing cultures are described in U.S. Pat. No. 6,136,351 (Oct. 24, 2000) entitled "Stabilization of Fermented Dairy Compositions Using Whey from Nisin-Producing Cultures"; and applications entitled "Stabilization of Mayonnaise Spreads Using Whey from Nisin-Producing Cultures", U.S. patent application Ser. No. 09/386,680, filed Aug. 31, 1999; "Stabilization of Cream Cheese Compositions Using Nisin-Producing Cultures", U.S. patent application Ser. No. 09/386,795, filed Aug. 31, 1999; "Stabilization of Cooked Meat Compositions Using Whey From Nisin-Producing Cultures", U.S. patent application Ser. No. 09/386,793, filed Aug. 31, 1999; and "Stabilization of Cooked Meat and Vegetable Compositions Using Whey From Nisin-Producing Cultures", U.S. patent application Ser. No. 09/779,712, filed Feb. 8, 2001. Each of these applications, which are owned by the same assignee as the present invention, are incorporated by reference in their entireties.

There remains a need for fully cooked refrigerated pasta compositions and procedures related to such fully cooked refrigerated pasta compositions that inhibit the growth of pathogenic microorganisms, and the production of toxins by them, using natural or innocuous ingredients. There also remains a need for fully cooked, refrigerated, and filled pasta compositions and procedures related to such fully cooked, refrigerated, and filled pasta compositions that inhibit the growth of pathogenic microorganisms, and the production of toxins by them, using natural or innocuous ingredients. The present invention addresses these needs.

SUMMARY OF THE INVENTION

This invention relates to stabilization of cooked pasta compositions against the development of toxins from pathogenic bacterial contaminants. The stabilized pasta compositions are attained by the incorporation of nisin-containing cultured whey derived from a nisin-producing culture in the pasta dough. The cooked pasta compositions of this invention, which include both filled and unfilled pasta compositions, are stable at refrigeration temperatures for 90 days or longer, and preferably for 120 days or longer, and require no further cooking (i.e., the pasta is fully hydrated and only requires warming before serving).

In an important embodiment, the nisin-containing cultured whey is obtained from the fermentation of a fortified cheese whey composition using a nisin-producing microorganism. In an alternative embodiment, the nisin-containing cultured whey is prepared by inoculating a pasteurized dairy composition with a culture of a nisin-producing microorganism, incubating the composition until the pH attains a value between about 6.2 and about 4.0 and a whey and curd mixture is formed, and separating the whey from the whey and curd mixture to give the separated whey which is the nisin-containing cultured whey.

The invention also provides a method of making stabilized fully cooked pasta compositions which are stable at refrigeration temperatures. The invention additionally provides a method of inhibiting the growth of a pathogenic microorganism in fully cooked pasta compositions during storage at refrigeration temperatures.

In important embodiments of the preparation and methods of the invention, the growth of microorganisms chosen from the group consisting of *Clostridium botulinum, C. perfringens, Listeria monocytogenes, Bacillus cereus, Staphylococcus aureus,* and *Enterococcus faecalis* is inhibited, and in a more preferred embodiment, the inhibited microorganism is *C. botulinum.*

The pasta of the present invention is prepared from pasta dough comprising about 55 to about 80 percent high protein wheat flour, about 1 to about 5 percent wheat gluten, 0 to about 20 percent egg product, 0 to about 3 percent dough conditioner, sufficient nisin-containing cultured whey to provide at least about 150 IU nisin/g pasta dough, and sufficient water to provide a total moisture content of about 25 to about 35 percent. Of course, the amount of nisin-containing cultured whey required will depend on the specific nisin-containing cultured whey; generally about 1 to 15 percent of the nisin-containing cultured whey will provide the desired level of nisin. More preferably, the pasta of the present invention is prepared from pasta dough comprising about 60 to about 70 percent high protein wheat flour, about 1 to about 4 percent wheat gluten, 0 to about 20 percent egg product, 0 to about 2 percent dough conditioner, sufficient nisin-containing cultured whey to provide about 200 to about 1200 IU nisin/g pasta dough, and sufficient water to provide a total moisture content of about 25 to about 35 percent. Even more preferably, the pasta of the present invention is prepared from pasta dough comprising about 62 to about 68 percent high protein wheat flour, about 2 to about 3.5 percent wheat gluten, 8 to about 12 percent egg product, about 0.01 to about 1 percent dough conditioner, sufficient nisin-containing cultured whey to provide about 300 to about 700 IU nisin/g pasta dough, and sufficient water to provide a total moisture content of about 28 to about 32 percent. Generally, the pasta dough contains about 25 to about 35 percent total moisture, and more preferably about 28 to about 32 moisture; the relative amounts of the ingredients, especially the nisin-containing cultured whey, egg product, and any added water, can be adjusted to obtain the desired moisture content.

Both unfilled and filled pasta can be prepared using the compositions and methods of this invention. Pasta with or without pasta sauces can also be prepared using the compositions and methods of this invention. Preferably, such fillings and sauces are prepared using the same or similar nisin-containing cultured whey as used to prepare the pasta dough. The final pasta products produced by the method of this invention generally contain about 40 to about 65 percent moisture, and preferably about 50 to 60 percent moisture. In spite of these relatively high moisture levels, the final pasta products of the present invention are stable at refrigeration temperatures for 90 days or longer, and preferably for 120 days or longer.

DETAILED DESCRIPTION OF THE INVENTION

This invention relates to stabilization of cooked pasta compositions against the development of toxins from pathogenic bacterial contaminants. The stabilized pasta compositions are attained by the incorporation of nisin-containing cultured whey derived from a nisin-producing culture. The cooked pasta compositions of this invention, which include both filled and unfilled pasta compositions, are stable at refrigeration temperatures for 90 days or longer, and preferably for 120 days or longer, in spite of their high moisture contents. They require no further cooking (i.e., the pasta is fully hydrated and only requires warming before serving). Both unfilled and filled pasta can be prepared using the compositions and methods of this invention. Pasta with or without pasta sauces can also be prepared using the compositions and methods of this invention. Preferably, such fillings and sauces are prepared using the same or similar nisin-containing cultured whey as used to prepare the pasta dough.

The pasta of the present invention is prepared from pasta dough comprising about 55 to about 80 percent high protein wheat flour, about 1 to about 5 percent wheat gluten, 0 to about 20 percent egg product, 0 to about 3 percent dough conditioner, sufficient nisin-containing cultured whey to provide at least about 150 IU nisin/g pasta dough, and sufficient water to provide a total moisture content of about 25 to about 35 percent. Of course, the amount of nisin-containing cultured whey required will depend on the specific nisin-containing cultured whey; generally about 1 to 15 percent of the nisin-containing cultured whey will provide the desired level of nisin. More preferably, the pasta of the present invention is prepared from pasta dough comprising about 60 to about 70 percent high protein wheat flour, about 1 to about 4 percent wheat gluten, 0 to about 20 percent egg product, 0 to about 2 percent dough conditioner, sufficient nisin-containing cultured whey to provide about 200 to about 1200 IU nisin/g pasta dough, and sufficient water to provide a total moisture content of about 25 to about 35 percent. Even more preferably, the pasta of the present invention is prepared from pasta dough comprising about 62 to about 68 percent high protein wheat flour, about 2 to about 3.5 percent wheat gluten, 8 to about 12 percent egg product, about 0.01 to about 1 percent dough conditioner, sufficient nisin-containing cultured whey to provide about 300 to about 700 IU nisin/g pasta dough, and sufficient water to provide a total moisture content of about 28 to about 32 percent. Generally, the pasta dough contains about 25 to about 35 percent total moisture, and more preferably about 28 to about 32 moisture; the relative amounts of the ingredients, especially the nisin-containing cultured whey, egg product, and any added water, can be adjusted to obtain the desired moisture content. Of course, the pasta dough of this invention may contain other optional ingredients normally included in conventional pasta. Such other ingredients include, for example, colorants, flavorants, and the like which are generally present at levels of 5 percent or less.

High quality, wheat-based flours are preferred in the practice of this invention. The flour should be of the glutinous type and have a minimum average protein content of about 12 to about 13.5 weight percent and preferably a minimum average protein content of about 13 to about 13.5 weight percent. Preferred wheat-based flours comprise 100 percent durum flours, 100 percent semolina flours, blends of about 50 to about 100 parts by weight durum flour and 0 to about 50 parts by weight hard red spring flour, and blends of about 50 to about 100 parts by weight semolina flour and 0 to about 50 parts by weight hard red spring flour. Generally flours having a granulation size such that about 98 percent minimum pass through a U.S. standard No. 70 sieve are acceptable.

The direct addition of nisin-containing cultured whey to a dry flour mixture alone generally interferes with protein binding in the flour. Thus, the mere addition of nisin-containing cultured whey to flour does not produce an acceptable pasta dough. To provide an acceptable pasta dough, wheat gluten (about 90 percent or greater protein) must be added at a level of about 1 to about 5 percent, preferably at a level of about 1 to about 4 percent, and most preferably at a level of about 2 to about 3.5 percent. The addition of wheat gluten gives the pasta dough acceptable dough strength and allows the dough to "sheet." The pasta dough of the present invention also contains 0 to about 20 percent egg product, and preferably about 8 to about 12 egg product. The egg product used in the present pasta dough is egg protein; examples of such egg products include whole eggs, egg whites, egg albumin, powdered eggs, and the like. The pasta dough of the present invention also contains 0 to about 3 percent dough conditioner, preferably about 0 to about 2 percent, and most preferably about 0.01 to about 1 percent. Conventional dough conditioners can be used in the pasta dough to provide suitable texture, workability, and the like. Suitable dough conditioners include monoglycerides, L-cysteine, ascorbic acid, azodicarbonamide, sodium bisulfite, potassium bromate, and the like; mixtures of such dough conditioners can also be used. One particularly preferred dough conditioner composition comprises a mixture of monoglycerides and L-cysteine. Preferably the pasta dough contains about 0.5 to about 1 percent monoglycerides and/or about 0.01 to about 0.1 percent L-cysteine.

The pasta dough is prepared by mixing the components in a suitable mixer for about 5 to about 15 minutes. Preferably, the wheat gluten is added to the pasta dough prior to addition of the nisin-containing cultured whey so that at least a portion of the wheat gluten is hydrated prior to the whey addition. For unfilled pasta products, the resulting pasta dough is then formed into the desired shaped pasta. Suitable shaped pasta includes, for example, elbow macaroni, elbow spaghetti, shells, mafalda, spaghetti, fettuccine, vermicelli, and the like. For filled pasta products, the resulting pasta dough is then sheeted in an appropriate kneader sheeter to for sheets of about 5/16 to about 3/8 inches thick and then filled and formed into the desired shape using a suitable filler/former apparatus. Suitable filled pasta includes, for example, ravioli, tortellini, tortelloni, and the like. The pasta products, whether filled or unfilled, are then preferably blanched (i.e., cooked) in a boiling water bath for about 1 to about 4 minutes. After cooking, the pasta products are packaged in suitable containers (e.g., oxygen impermeable plastic packages, pouches, or other containers). The pasta may be pasteurized before or after packaging. After packaging, the pasta can be stored under refrigeration temperatures for 90 days or longer, and preferably for 120 days or longer. The moisture content of the pasta is about percent or greater, and preferably about 50 to about 60 percent. Since the pasta is fully cooked, it is suitable for heating and serving.

Fillings are prepared by adding cheese and other solid materials (e.g., breadcrumbs, meat, vegetables, fruits, grains, nuts, spices, mixtures thereof, and the like) to a chopper or other device to size reduce the materials. After particles are reduced to about ¼ inch or less, the appropriate liquids, including water, vegetable oil, and, if desired, nisin-containing cultured whey, are added. In addition, the filling may contain flavorings including herbs and spices, colorings, thickening agents including starches, pectins, and similar polysaccharides, fats or oils, and emulsifiers. It may also be supplemented with inorganic salts of lactic acid. Generally, spices are added last.

Figure 1:
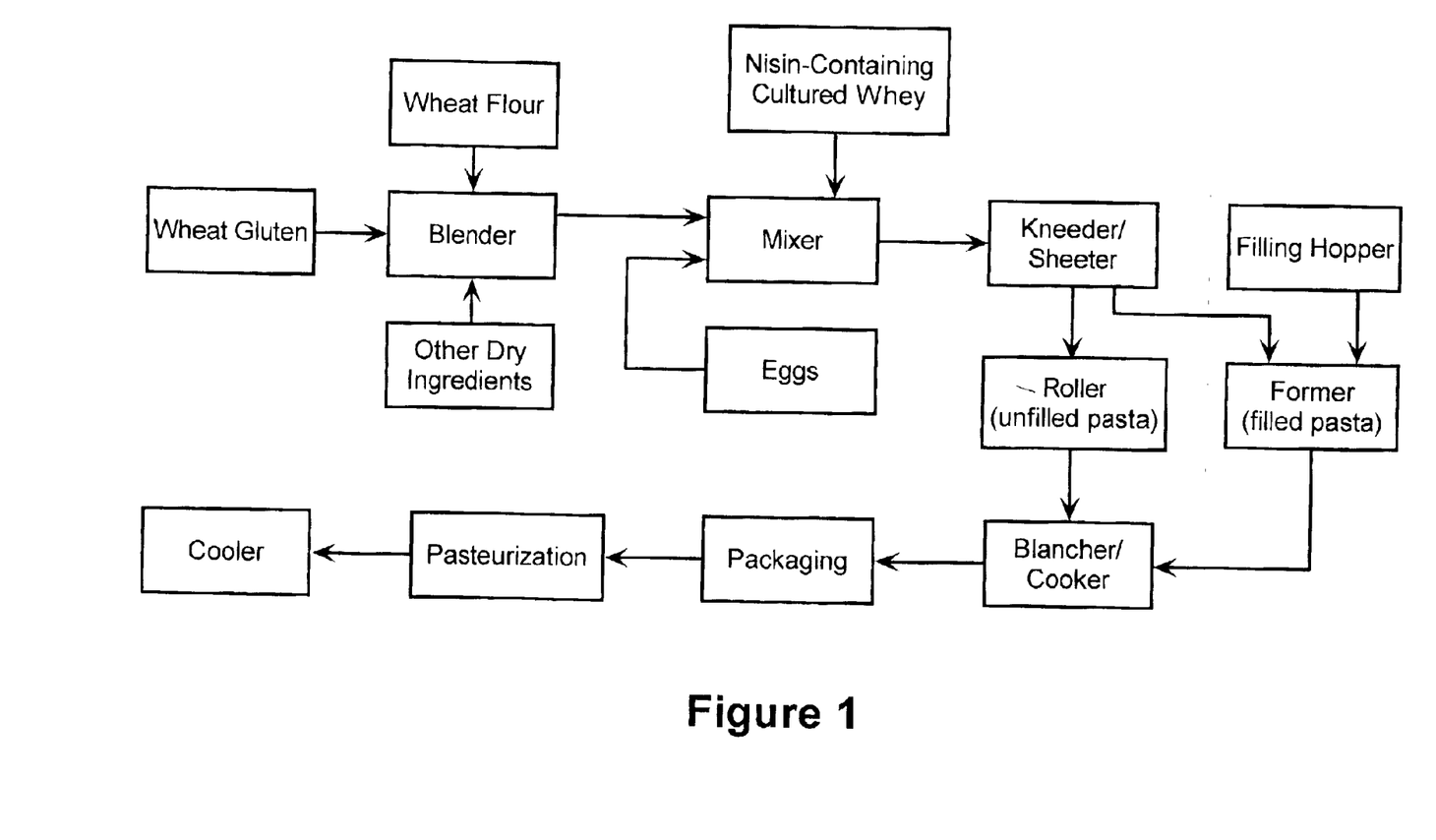
FIG. 1 provides a flow chart illustrating a preferred process for the production of the fully cooked pasta compositions of the present invention. The portion of the drawing included within the dashed box includes steps for preparing filled pasta.

The general process for preparing the fully cooked, stabilized pasta of the present invention is illustrated in FIG. 1. The appropriate flour, wheat gluten, and other dry ingredients (e.g., dough conditioners, spices, colorants, and the like) are blended together to form a pre-dough. Nisin-containing cultured whey, egg products (if desired), and water (if needed to obtain desired moisture levels) are mixed into the pre-dough to form the pasta dough. The pasta dough is then formed into relatively thin sheets (generally about 0.045 to about 0.055 inches thick). If unfilled pasta is to be prepared, the sheet is cut or formed into the desired shapes using roller equipment. If desired, unfilled pasta could also be formed using other conventional equipment such as, for example, extruders. If filled pasta is desired, the sheets are formed into the appropriate shapes on a former, filled with the desired filling, and sealed. The resulting pasta (filled or unfilled) is then blanched or cooked using convention techniques. Once blanched or cooked, the pasta is packaged in appropriate containers (e.g., plastic pouches), preferably under an oxygen-reduced or oxygen-free atmosphere and then pasteurized. After pasteurization, the pasta is cooled to refrigeration temperatures where it is maintained until ready to be used. To prepare, the consumer merely warms the pasta and serves it as desired.

For purposes of this invention, the terms "nisin-containing whey" and "nisin-containing cultured whey," which can be used interchangeably, are intended to include the whey product derived from a nisin-producing culture. Generally, such a nisin-containing cultured whey is obtained by any of a variety of equivalent procedures involving fermentation by a nisin-producing microorganism in an acceptable medium (e.g., whey, corn syrup, sugar solution, and the like). In one such procedure, the nisin-containing cultured whey is obtained from the fermentation of a fortified cheese whey composition using nisin-producing microorganisms. In this procedure, after the pH in the fermentation has fallen to about 5.5, the pH is maintained at this value for 8–10 hrs before allowing the pH to drop further. In an alternative procedure, a pasteurized dairy product such as milk is first inoculated with the nisin-producing microorganism. Following curd formation, the nisin-containing whey is separated from the curds of the curdled culture. The curds and whey can be separated by any conventional technique, including, for example, centrifugation, filtration, and the like. This method effectively removes most or essentially all of the microorganisms in the nisin-containing cultured whey. The nisin-containing cultured whey, however produced, is then employed in the products and methods of this invention.

Cultures capable of producing nisin-containing cultured whey have the potential of secreting many fermentation products into the fermentation medium. Thus, in addition to nisin and lactate, there may be further components present in nisin-containing cultured whey produced by the fermentations yielding this whey. Among such components may be certain substances which contribute to the beneficial properties of the preservable preparations of the invention, and to the beneficial effects of the methods of the invention. Without wishing to limit the scope of this invention, therefore, the terms "nisin-containing whey" and "nisin-containing cultured whey" encompass all components contained therein, both those currently known and those which may remain uncharacterized at the present time, that contribute to the beneficial attributes of the present invention.

As used herein, "nisin-containing whey" and "nisin-containing cultured whey" also relates to the whey described above that has subsequently been reduced in volume to a more concentrated liquid, or that has been completely dried, by evaporation, lyophilization, or comparable procedures. The terms relate additionally to such a concentrated or dried whey that is subsequently reconstituted, either partially or completely, by the addition of water or a water-containing composition.

As used herein, the term "stabilized preparation" as applied to cooked pasta compositions relates to a preparation which has been treated so that the growth of pathogenic microorganisms that may contaminate the preparation is inhibited or is retarded, or in which the production of toxins by such microorganisms is inhibited or retarded.

As used herein, "sauce" relates to sauces incorporated into, or provided with, the pasta compositions of this invention. The sauce may also contain nisin-containing cultured whey. This is readily accomplished by replacing some or all of the water that would otherwise be used to constitute the sauce by the nisin-containing cultured whey. If used, the nisin-containing cultured whey is preferably added to the sauce at a level to provide at least about 150 IU nisin/g, preferably about 200 to about 1200 IU nisin/g, and most preferably about 300 to about 700 IU nisin/g. In addition, the sauces may contain other components that are commonly employed in their preparation. Such ingredients are widely known among food chemists. Preferably, the pasta and sauce are packaged separately in the final product for retail sale.

As used herein, "filling" relates to food compositions which can be included in filled pasta forms. Preferably, such fillings also contains nisin-containing cultured whey. This is readily accomplished by replacing some or all of the water that would otherwise be used to constitute the filling by the nisin-containing cultured whey of the invention. In addition, the fillings may contain other components that are commonly employed in their preparation. Such ingredients are widely known among food chemists. Such fillings can include, for example, cheese, meat, vegetable, sauce, and the like. A wide variety of cheeses can be included in the filling, including, for example, natural cheeses, process cheeses, cream cheeses, and the like. Meats that can be included in the filling may be obtained from mammalian sources such as beef, pork, and lamb, as well as from poultry, vertebrate fish, and nonvertebrate seafood. Vegetables for use in the filling include a wide variety of green, yellow, orange, and red vegetables. Such vegetables include, for example, carrots, various types of peppers, broccoli, various types of peas and pea-pods, cauliflower, onions, tomatoes, mushrooms, zucchini, corn, celery, asparagus, green beans, water chestnuts, bamboo shoots, and the like.

For purposes of this invention, a pasta of the "warm and serve variety" is a pasta product provided in a retail package which needs only to be heated to a suitable serving temperature before consumption. Such a "warm and serve variety" pasta product does not need to be cooked by the consumer since it is already fully cooked when purchased by the consumer.

Figure 2:
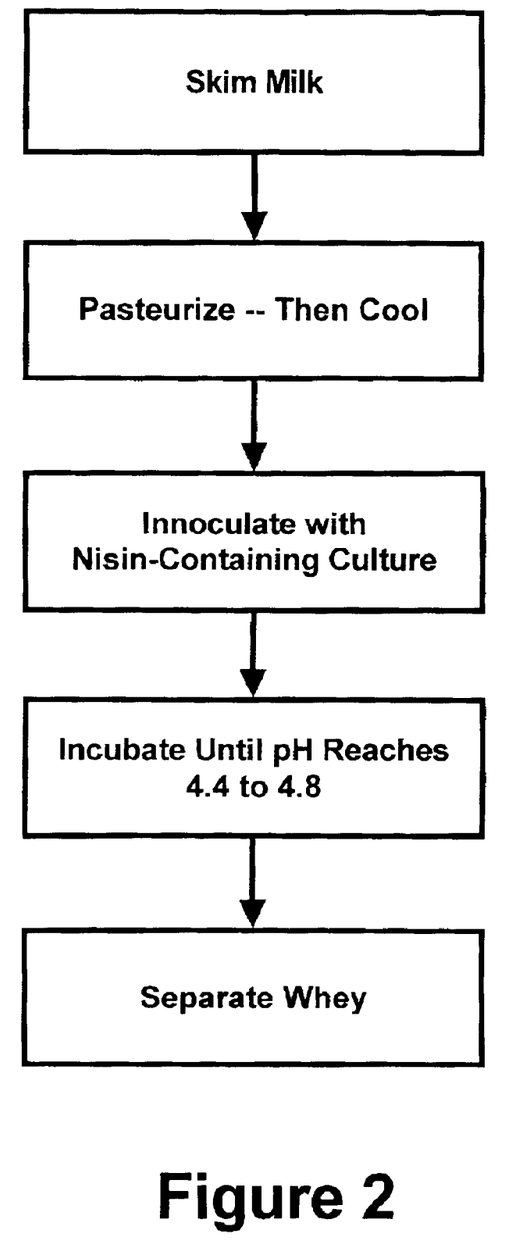
FIG. 2 provides a flow chart illustrating a process for the production of nisin-containing cultured whey.
Figure 3:
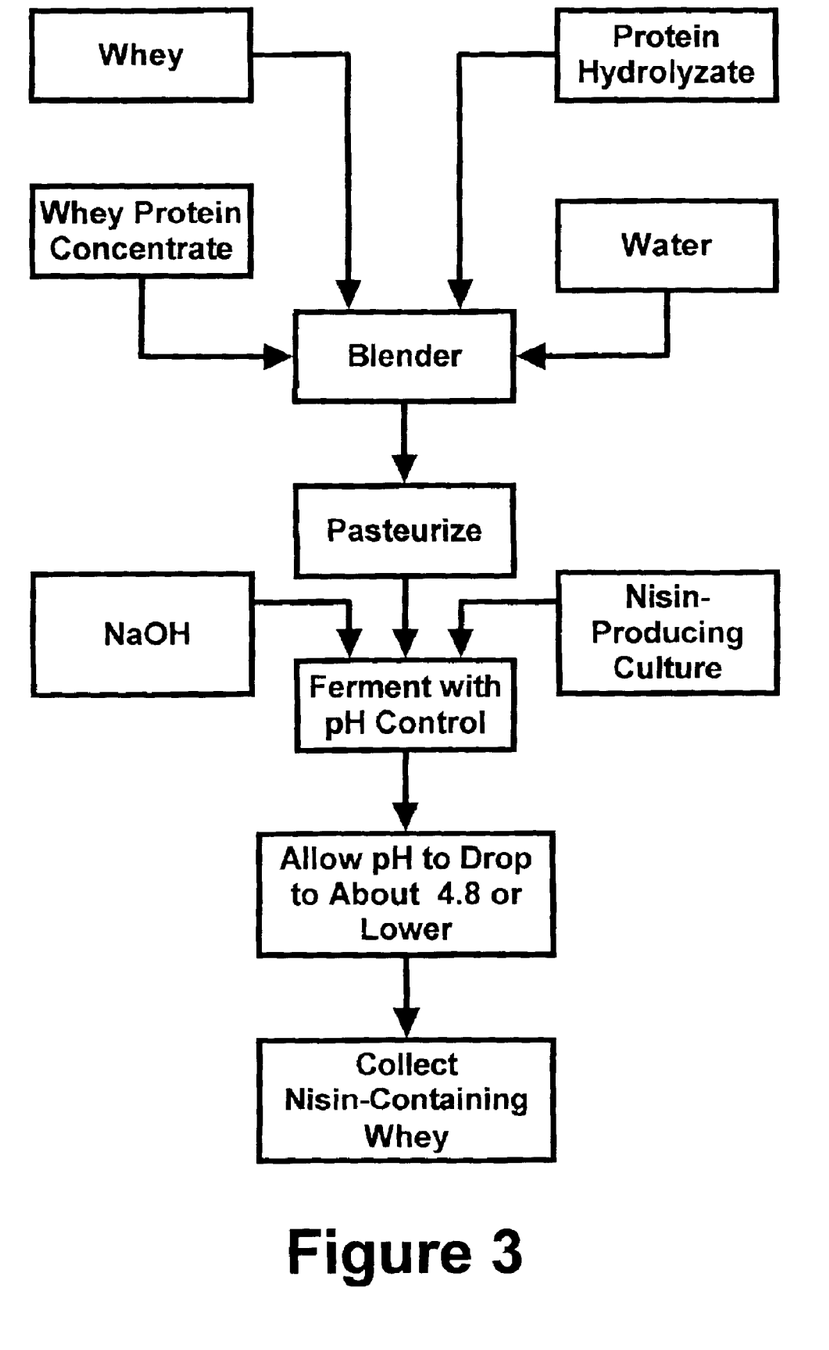
FIG. 3 provides another flow chart illustrating another process for the production of nisin-containing cultured whey.

Stabilization of the pasta compositions against the hazardous proliferation of pathogenic microorganisms is shown in the present invention to result from the incorporation of nisin-containing cultured whey in such foods. The nisin-containing cultured whey may be prepared, as generally illustrated in FIG. 3, by the sequential steps of (i) preparing an aqueous composition comprising sweet whey from the fermentation of a cheese, whey protein concentrate, and a protein hydrolysate; (ii) fermenting the aqueous composition with a nisin-producing culture until the pH attains about 5.5; (iii) maintaining the pH of the fermenting composition at about 5.5 for 8–10 hrs; and (iv) allowing the pH of the fermenting composition to drop to 4.8 or lower. Alternatively, nisin-containing cultured whey used in this invention may be obtained using a procedure, as generally illustrated in FIG. 2, that includes the following steps: (i) pasteurizing a dairy liquid such as milk, whether whole milk, partially defatted milk or skim milk, (ii) cooling and inoculating the liquid with a culture of a nisin-producing microorganism, (iii) incubating until the pH has fallen to a range of 4.4 to 4.8 as a result of the fermentation, whereupon a suspension of curds in liquid whey is formed, and (iv) separating the curds from the whey, for example by centrifugation or filtration. An example of a nisin-producing microorganism is *Lactococcus lactis* subsp. *lactis*. The resulting whey is the nisin-containing cultured whey of the invention. After collecting the nisin-containing cultured whey, it may be used as is, or it may be centrifuged in order to use the supernatant only, or a concentrate may be prepared by evaporation of the whole fermented whey. Generally nisin-containing cultured whey concentrates are preferred since it is generally easier to control the moisture content of the pasta dough to the desired levels by adding water. Preferably such nisin-containing cultured whey concentrates have a solids content greater than about 30 percent and a nisin activity greater than about 5000 IU/g; more preferably such nisin-containing cultured whey concentrates have a solids content about 45 to about 50 percent solids and a nisin activity greater than about 10,000 IU/g.

In order to prepare the filled pasta of the present invention, the filling is preferably formulated using an effective amount of the nisin-containing cultured whey derived from a nisin-producing culture as a portion or all of the aqueous component contained therein. Generally, such effective amounts may range from about 5 to about 25 percent of the filling. In addition, the filling may contain flavorings including herbs and spices, colorings, thickening agents including starches, pectins, and similar polysaccharides, fats or oils, and emulsifiers. It may also be supplemented with inorganic salts of lactic acid.

Cheese based fillings are preferred. Natural cheese based fillings are especially preferred. Suitable cheese based fillings generally contain about 20 to about 90 percent cheese, sufficient nisin-containing cultured whey to provide at least 150 IU nisin/g filing (preferably about 200 to about 1200 IU nisin/g, and most preferred 300 to 700 nisin/g), and 0 to about 20 percent flavorants/spices; generally the level of nisin-containing cultured whey is about 5 to about 15 percent. The filling may also contain meat and/or vegetables. Meat and/or vegetables included in the filling are preferably stabilized using nisin-containing cultured whey. Suitable meat or meat/vegetable based fillings generally contain about 40 to about 60 percent meat or meat/vegetables, sufficient nisin-containing cultured whey to provide at least about 150 IU nisin/g, preferably about 200 to about 1200 IU nisin/g filling, and 0 to about 20 percent flavorants/spices. The fillings may also contain additional water, as well as gums, thickeners, emulsifiers, binders, and the like to achieve the desired texture and/or consistency.

For the meat or meat/vegetable based fillings, preferably, the meat and vegetables are cut into bite-size or other appropriate pieces (e.g., about ¼ to 1 inch pieces). The meat pieces and the vegetables can be blanched in the nisin-containing cultured whey to allow penetration of the stabilizing effect into the core of the meat and vegetable pieces. Normally such blanching is at a temperature of about 100 to about 140° F. for about 4 to about 8 minutes. More preferably, the vegetable and meat pieces are blanched at a temperature of about 115 to about 125° F. for about 5 to about 6 minutes. Either before or after blanching, any desired sauce can be added to the meat and vegetable pieces. The meat, vegetables, and sauce combination is then cooked until its temperature attains a temperature in the range from about 160 to about 200° F., preferably to a temperature of about 190° F. This may be accomplished by heating in a bath, or using a heat source, maintained at a temperature of about 190 to about 212° F. The heating step may endure for a time ranging from about 3 min to about 20 min, and preferably lasts about 10 min. Preferably, the mixture is also heated to a temperature exceeding about 190° F. for about 60 to about 120 seconds to destroy or inactivate non-proteolytic spores. For the meat-vegetable compositions, it is generally preferred that the meat is at least partially cooked prior to addition of the vegetables to prevent overcooking the vegetables.

Meat included in the filling may be raw, partially cooked, or fully cooked; preferably, such meat is partially or fully cooked. Cooking prior to incorporation into the preparation generally entails heating the meat to a temperature in the range of about 150 to about 180° F., preferably about 160° F., and then cooling to a refrigerated temperature of about 40° F. Raw or partially cooked meat can be cooked in combination with the filling. In general, the meat may be various cuts of beef, veal, pork, or lamb. It may also be a poultry meat, which may be by way of nonlimiting example, turkey, chicken, or duck. The meat may also be a seafood product, such as a vertebrate fish or an invertebrate shellfish. The remaining filling ingredients are then combined with the meat. Therefore the meat, when it is to be incorporated into such a filling, is sliced or otherwise reduced into portions appropriate for such a final product. Suitable vegetables for use in such fillings include a wide variety of green, yellow, orange, and red vegetables. Such vegetables include, for example, carrots, various types of peppers, broccoli, various types of peas and pea-pods, cauliflower, onions, tomatoes, mushrooms, zucchini, corn, celery, asparagus, green beans, water chestnuts, bamboo shoots, and the like. Especially preferred meat and meat/vegetable combinations for use in the fillings of this invention include those described in "Stabilization of Cooked Meat Compositions Using Whey From Nisin-Producing Cultures", U.S. Patent Application Serial No. 09/386,793, filed Aug. 31, 1999; and "Stabilization of Cooked Meat and Vegetable Compositions Using Whey From Nisin-Producing Cultures", U.S. patent application Ser. No. 09/779,712, filed Feb. 8, 2001.

The finished pasta product is preferably cooked or blanched in boiling water to complete cooking. After cooking, the pasta is preferably introduced into a pouch and sealed after drawing a vacuum. The product is then cooled to a refrigerated temperature of about 40° F. The resulting pasta can readily be prepared by the consumer in, for example, a microwave oven or a boiling water bath. Since the pasta product is fully cooked, no further cooking is required. Thus, the consumer only needs to heat the pasta composition (e.g., in a microwave oven) to a suitable serving temperature and serve the pasta meal or side dish.

Both the filled and unfilled pastas can also be combined with various pasta sauces. Such sauces are preferably prepared using the nisin-containing cultured whey. Such sauces can be separately packaged or can be packaged with the pasta compositions in appropriate kit formulations to provide complete, ready to heat and serve meals and main or side dishes. Such kit formulation prepared with nisin-containing cultured whey are generally stable at refrigeration temperatures for 90 days or longer, and preferably for 120 days or longer. If desired, such kit formulations could also be frozen to provide even longer shelf lives.

The following examples are intended to illustrate the invention and not to limit it. Unless otherwise indicated, all percentages are by weight.

EXAMPLES

General Methods. Aerobic plate count was performed using the procedure outlined in Bacteriological Analytical Manual (U.S. Food and Drug Administration), 8th Edition, 1995, Chapter 3. The plating medium used was brain heart infusion (BHI) agar. *Streptococcus salivarius* subsp. *thermophilus* (ST) was enumerated on M17 agar (Atlas, R.M., 1993, Handbook of Microbiological Media, CRC Press, Inc., Pages 148, 532, 621). *Lactobacillus bulgaricus* (LB) was enumerated on MRS agar (Atlas, *ibid.*). The plates for ST and LB were incubated anaerobically at 104° F. for two days. The nisin producing lactococci were enumerated on BHI agar, incubated anaerobically at 86° F. for two days. Anaerobic plate count was performed using prepoured McClung's Egg Yolk agar. The sample was spread plated and incubated 48 hours at 86° F. in a Coy Anaerobic Chamber.

Nisin activity in the fermented milk was determined by the method of Fowler et al. (Techn. Series Soc. Bacteriol. 8:91–105 (1975)). The strain *L. lactis* subsp. *cremoris* that is sensitive to nisin was used as an indicator. Nisaplin™, a standardized preparation of nisin ($10^6$ units/g) from Aplin and Barrett, was used as the standard to determine nisin activity in various preparations. Each assay plate had nisin standards.

Toxin extraction was done on each sample by using the procedure for botulinal toxin (Bacteriological Analytical Manual (U.S. Food and Drug Administration) 8th Edition, 1995, Chapter 17). A Tekmar Stomacher 400 Lab Blender and sterile bags were used for maceration of samples in gel phosphate buffer. Standard mouse bioassays and toxin confirmations were performed as outlined in the FDA's Bacteriological Analytical Manual.

Example 1

This example illustrates the production of nisin-containing cultured whey from a nisin-producing culture. The significant steps involved are shown schematically in FIG. 2. A nisin-producing culture was inoculated at $5\times10^6$ CFU/ml in pasteurized skim milk cooled to 86° F. The mixture was allowed to ferment for about 16 hours and was then cooled to 40–45° F. The fermented milk had about $8.0\times10^8$ CFU/ml of the cultured bacteria, a pH of about 4.4 to 4.6, and a titratable acidity of 0.75 percent. It contained nisin equivalent activity of about 1300 IU/g as determined by well assay using a nisin-sensitive strain of *Lactococcus lactis* subsp. *cremoris*. The cultured milk was centrifuged to separate the whey from the curd and the nisin-containing cultured whey removed. A detailed comparison between the fermented milk and the resulting whey is given in Table 1. The whey contained more than about 100-fold fewer CFU/ml of the nisin-producing microorganisms compared to the fermented milk culture while still preserving the full nisin activity of the fermented milk. The curd retained more than 99 percent of the lactococcus counts determined for whey and curd together.

TABLE 1

Characteristics of Centrifuged Nisin-Containing Cultured Whey Obtained from Lactococcus-Fermented Skim Milk

|  | Fermented Milk | Whey | Curd |
|---|---|---|---|
| pH | 4.43 | 4.45 | 4.5 |
| Titratable acidity | 0.75% | 0.54% | — |
| Culture count | $8.0 \times 10^8$ CFU/g | $6.6 \times 10^6$ CFU/g | $3.9 \times 10^9$ CFU/g |
| Nisin equivalent activity | 1300 IU/g | 1300 IU/g | 600 IU/g |

Example 2

This example also illustrates the preparation and properties of a nisin-containing cultured whey derived from a nisin-producing culture. This example is essentially the process illustrated in FIG. 2. Milk was inoculated with approximately $5\times10^6$ CFU/g nisin-producing lactococci and fermented until the culture attained a pH of 4.43. The fermented milk was then centrifuged at 10,000 rpm for 15 minutes and the supernatant (i.e., whey) was recovered. The whey had a pH of 4.45 and a nisin activity of about 1300 IU/g (essentially the same values as in the fermented milk prior to centrifugation). The whey had a culture population of $6.6\times10^6$ CFU/ml (as compared to $8.0\times10^8$ CFU/ml in the original fermented milk; see Table 1). The whey recovered from a dairy fermentation of nisin-producing microorganisms has a titer of nisin-producing lactococci that is less than about 1 percent of that of the fermentation prior to separation of the whey.

In a second run, a skim milk/whey mixture was fermented at pH 5.5 for about 8–10 hours and then allowed to acidify further to a pH of about 4.6. The resulting nisin-containing cultured whey from a pH controlled propagation had a pH of about 4.65, a lactate concentration of about 13.05 g/L, and a nisin activity of about 2,100 IU/g.

Example 3

This example provides a process for producing nisin-containing cultured whey yielding a high level of nisin equivalent activity. This example is essentially the process illustrated in FIG. 3. Sweet whey from fermentations of cheeses such as Swiss cheese, Parmesan cheese, mozzarella cheese, or cheddar cheese is fortified with whey protein concentrate (WPC) and a protein hydrolysate which may be, for example N-Z amine™ or soy protein hydrolysate. The components are blended with water as shown:

| Cheese whey (Krafen ™) | 3.8% (total solids basis) |
| WPC | 2.9% |
| Protein hydrolysate | 0.1% |
| Water | 93.2% |

The blended formulation (pH about 6.1 to about 6.25) is pasteurized, cooled, and inoculated with a culture containing about $10^8$ to $10^9$ CFU/g nisin-producing microorganisms to a level of about $10^6$ CFU/g. The fermentation is allowed to proceed to pH 5.5 with stirring, which requires about 7 to 8 hrs. The pH is then maintained at pH 5.5 for 8 to 10 hrs by the addition concentrated NaOH by means of a pH controller. The pH regulation is then stopped and the pH allowed to drop to pH 4.8 or lower, at about 22 hrs of total fermentation time. This resulting preparation has a nisin activity of about 2500 IU/g. If necessary it may be centrifuged in order to use the supernatant only, or the whole fermented whey may be used directly, or a concentrate may be prepared by evaporation of the whole fermented whey.

Example 4

This example illustrates the preparation of a mozzarella/garlic filled tortelloni pasta using the method of this invention. A dry spice blend was prepared containing about 47 percent salt, about 44 percent dried garlic granules, and about 9 percent sage salt. A filing preparation was prepared by gently blending about 70 percent mozzarella cheese and about 30 percent breadcrumbs to form a cheese mixture with the breadcrumbs evenly dispersed throughout. Nisin-containing cultured whey (about 13.3 percent with a nisin activity of about 10,000 IU/g as prepared in Example 3 above) was added and mixed so that the moisture is absorbed by the breadcrumbs. The dry spice blend (about 2 percent) is then mixed into the cheese mixture. Finally, about 1 percent canola oil is added and blended until homogenous. The filling is stored at refrigerated temperatures until used.

The pasta dough is prepared in a paddle mixer using about 65 percent semolina flour, about 9.5 percent whole egg, about 11 percent egg whites, about 2 percent water, and about 8.8 percent nisin-containing cultured whey with a nisin activity of about 10,000 IU/g as prepared in Example 3 above. Preferably, the nisin-containing cultured whey is added so as to mix with the flour as it is pulled from the bottom of the paddle mixer by the paddles in order to improve dispersion. The resulting pasta dough is feed into a kneader sheeter set to produce a dough sheet about 0.045 to about 0.055 inches thick.

The resulting dough sheet is then formed into tortolloni shapes, filled with the filling (about 33 to about 35 percent filling), and then sealed. The resulting filled tortolloni are blanched at a temperature of about 200° F. for about three to four minutes. The blanched product is cooled using water spray in a tumble cooler; excess water is removed on a shaker table. The filled pasta is packaged in a plastic pouch under a carbon dioxide and nitrogen enriched atmosphere. The sealed pouches are then pasteurized and then cooled to refrigeration temperatures in less than 5 hours. The final produce is maintained at about 35 to about 45° F. The final product is a warm and serve pasta dish.

Example 5

Clostridium Botulinum Strains Used in the Challenge Studies

The following strains were blended to prepare inocula of C. botulinum for use in the challenge studies with cooked pasta compositions preserved using varying amounts of nisin-containing cultured whey.

TABLE 2

| C. botulinum strains Used in Challenge Studies | | | |
|---|---|---|---|
| Proteolytic Strains | | Non-Proteolytic Strains | |
| Strain | Spore Count/ml | Strain | Spore Count/ml |
| 33A | $2.6 \times 10^5$ | 17B | $\sim 3 \times 10^5$ |
| 36A | $5.4 \times 10^4$ | | |
| 62A | $1.3 \times 10^5$ | | |

TABLE 2-continued

| C. botulinum strains Used in Challenge Studies | | | |
|---|---|---|---|
| Proteolytic Strains | | Non-Proteolytic Strains | |
| Strain | Spore Count/ml | Strain | Spore Count/ml |
| 213B | $3.7 \times 10^5$ | | |
| 53B | $2.0 \times 10^5$ | | |
| ACC1B | $3.4 \times 10^5$ | | |

No growth of the spores was observed on brain-heart infusion agar incubated under aerobic conditions. Thus, the spore suspensions were essentially free of aerobic spores. For the proteolytic strains, 1 ml aliquots of each of the strains were combined and heat-shocked at 80° C. for 10 min. This suspension was assayed under anaerobic conditions on McClung's egg yolk agar and found to contain 105 spores/ml. For the non-proteolytic strain, 1 ml aliquot of the strain was heat-shocked at 60° C. for 13 min. This suspension was assayed anaerobically on McClung's egg yolk agar and shown to contain $10^5$ spores/ml. Finally, aliquots (several millimeters) of the proteolytic and non-proteolytic spore suspensions were added to separate atomizer bottles for further inoculation into pasta product. An appropriate volume of this $10^5$ spores/ml inoculum was added to a sample of the pasta product to achieve about 100–500 spores/g final inoculum level.

Example 6

Clostridium Botulinum Challenge Study Using Cooked Pasta Compositions Supplemented With Nisin-Containing Cultured Whey Cooked pasta compositions were prepared using a control pasta (no cultured whey) and pasta formulated with nisin-containing cultured whey according to the method presented in Example 4.

Separate challenge studies were implemented for inocula of non-proteolytic strains of C. botulinum and proteolytic strains of C. botulinum. The spore inocula contained the strains disclosed in Example 5. A heat shocked suspension of the respective spores (proteolytic, nonproteolytic—population each about $1 \times 10^5$ spores/ml) was transferred to an atomizer. An appropriate volume of the appropriate spore suspension was then inoculated into 3000 g of the control or experimental pasta composition that had been prepared according to Example 4. The spore count in the resulting products was about 100–500 spores/g. Uninoculated product was similarly prepared, using sterile water in place of spore suspensions. Inoculated and uninoculated pasta samples were sealed into pouches containing an anaerobic atmosphere and incubated at 86° F. for various periods of time. These were assayed for pH, nisin concentration, aerobic colony count, anaerobic colony counts for non-proteolytic and for proteolytic strains of C. botulinum, and by the standard mouse bioassay procedure for presence of botulinum toxin. The results are shown in Table 3.

TABLE 3

Efficiency of Nisin-Containing Cultured Whey as an Inhibitor of *Clostridium botulinum* Growth and Toxin Production in Cooked, Mozzarella/Garlic Filled Pasta
Nonproteolytic inoculum suspension: 5.3 × 10⁴ CFU/ml
Proteolytic inoculum suspension: 2.3 × 10⁵ CFU/ml

| | Time (Hours) at 86° F. | | | | | | | | | | | | | | |
|---|---|---|---|---|---|---|---|---|---|---|---|---|---|---|---|
| | 0 | 18 | 24 | 30 | 36 | 42 | 48 | 54 | 60 | 66 | 72 | 78 | 84 | 90 | 96 |
| Mozzarella/Garlic Filled Pasta Control (No Nisin-Containing Cultured Whey) | | | | | | | | | | | | | | | |
| Product pH | 5.60 | NT | 5.62 | NT | NT | NT | 5.51 | NT | NT | NT | 5.53 | NT | NT | NT | 5.74 |
| Nisin Concentration (U/g) | NT | NT | NT | NT | NT | NT | NT | NT | NT | NT | NT | NT | NT | NT | NT |
| Aerobic background (CFU/g) | 40* | NT | 6.5 × 10³* | NT | NT | NT | 4.3 × 10⁵* | NT | NT | NT | 8.2 × 10⁵* | NT | NT | NT | NT |
| Inoculum counts (CFU/g) | | | | | | | | | | | | | | | |
| Uninoculated | <10 | NT | NT | NT | NT | NT | NT | NT | NT | NT | NT | NT | NT | NT | NT |
| Nonproteolytic Inoculated | 120 | NT | NT | NT | NT | NT | NT | NT | NT | NT | NT | NT | NT | NT | NT |
| Proteolytic Inoculated | 170 | NT | NT | NT | NT | NT | NT | NT | NT | NT | NT | NT | NT | NT | NT |
| Mouse bioassay toxin results: | | | | | | | | | | | | | | | |
| Uninoculated | – | – | – | – | – | – | – | – | – | – | – | – | – | – | – |
| Nonproteolytic Inoculated | – | – | – | 30 | + | + | + | + | + | + | + | + | + | NT | NT |
| Proteolytic Inoculated | – | – | – | – | – | – | – | – | – | – | – | + | + | + | + |
| Mozzarella/Garlic Filled Pasta with 4% Nisin-Containing Cultured Whey | | | | | | | | | | | | | | | |
| Product pH | 5.62 | NT | 5.62 | NT | NT | NT | 5.60 | NT | NT | NT | 5.64 | NT | NT | NT | 5.62 |
| Nisin Concentration (U/g) | 180 | NT | 170 | NT | NT | NT | 170 | NT | NT | NT | 160 | NT | NT | NT | 170 |
| Aerobic background (CFU/g) | 10* | NT | 20* | NT | NT | NT | 10* | NT | NT | NT | 10* | NT | NT | NT | 40* |
| Inoculum counts (CFU/g) | | | | | | | | | | | | | | | |
| Uninoculated | <10 | NT | NT | NT | NT | NT | NT | NT | NT | NT | NT | NT | NT | NT | NT |
| Nonproteolytic Inoculated | 100 | NT | NT | NT | NT | NT | NT | NT | NT | NT | NT | NT | NT | NT | NT |
| Proteolytic Inoculated | 290 | NT | NT | NT | NT | NT | NT | NT | NT | NT | NT | NT | NT | NT | NT |
| Mouse bioassay toxin results: | | | | | | | | | | | | | | | |
| Uninoculated | – | – | – | – | – | – | – | – | – | – | – | – | – | – | – |
| Nonproteolytic Inoculated | – | – | – | – | – | – | – | – | – | – | – | – | – | – | – |
| Proteolytic Inoculated | – | – | – | – | – | – | – | – | – | – | – | – | – | – | – |
| Mozzarella/Garlic Filled Pasta with 6% Nisin-Containing Cultured Whey | | | | | | | | | | | | | | | |
| Product pH | 5.60 | NT | 5.59 | NT | NT | NT | 5.58 | NT | NT | NT | 5.60 | NT | NT | NT | 5.62 |
| Nisin Concentration (U/g) | 240 | NT | 240 | NT | NT | NT | 230 | NT | NT | NT | 220 | NT | NT | NT | 230 |
| Aerobic background (CFU/g) | <10 | NT | 10* | NT | NT | NT | 10* | NT | NT | NT | <10 | NT | NT | NT | 10* |
| Inoculum Counts (CFU/g) | | | | | | | | | | | | | | | |
| Uninoculated | <10 | NT | NT | NT | NT | NT | NT | NT | NT | NT | NT | NT | NT | NT | NT |
| Nonproteolytic Inoculated | 90 | NT | NT | NT | NT | NT | NT | NT | NT | NT | NT | NT | NT | NT | NT |
| Proteolytic Inoculated | 380 | NT | NT | NT | NT | NT | NT | NT | NT | NT | NT | NT | NT | NT | NT |
| Mouse bioassay toxin results: | | | | | | | | | | | | | | | |
| Uninoculated | – | – | – | – | – | – | – | – | – | – | – | – | – | – | – |
| Nonproteolytic Inoculated | – | – | – | – | – | – | – | – | – | – | – | – | – | – | – |
| Proteolytic Inoculated | – | – | – | – | – | – | – | – | – | – | – | – | – | – | – |

*Bacillus spp.
NT = Not Tested

The results in Table 3 show that use of the nisin-containing cultured whey of the invention resulted in a significant delay of toxin production, compared to the control in which nisin-containing cultured whey has been omitted. Toxin from nonproteolytic *C. botulinum* was first detected at 30 hours in the control pasta. In the pasta formulated with nisin-containing cultured whey, nonproteolytic *C. botulinum* did not produce toxin during the 96-hour study. With the proteolytic strains of *C. botulinum*, toxin was first detected at 78 hours in the control pasta. In pasta formulated with nisin-containing cultured whey, proteolytic *C. botulinum* did not produce toxin during the 96-hour study. It was noted that low background levels of Bacillus present in the pasta grew to a high population in the control preparation within 48 hours. In the samples formulated with nisin-containing cultured whey, the growth of Bacillus was inhibited throughout the 96-hour study. Thus the nisin-containing cultured whey formulated product delayed toxin production by the significant intervals of greater than 66 hours (nonproteolytic inoculum) and greater than 18 hours (proteolytic strains) as compared to the control pasta without cultured whey.

Additional challenge studies were carried out separately on cooked, cheese-filled and meat-filled varieties of pasta formulated with the nisin-containing cultured whey. Studies were conducted with the same *C. botulinum* strains described in Example 5, using essentially the same techniques as described in Example 6. Products were formulated as described in Example 4 and held under abusive refrigerated conditions. The results are shown in Tables 4 and 5.

TABLE 4

*Clostridium botulinum* Control in Cooked, Cheese-Filled Pasta Under Refrigerated Storage
Nonproteolytic inoculum suspension: 3.0 × 10$^5$ CFU/ml
Proteolytic inoculum suspension: 2.1 × 10$^5$ CFU/ml

|  | Initial | 24 hrs at 86° F. | 1 wk at 65° F. | Weeks at 55° F. | | | | | |
|---|---|---|---|---|---|---|---|---|---|
|  |  |  |  | 2 | 4 | 6 | 9 | 10 | 12 |
| Cheese-Filled Pasta with Nisin-Containing Cultured Whey (6% filling, 4% dough) | | | | | | | | | |
| Product pH | 5.74 | 5.65 | 5.48 | 5.66 | 5.71 | 5.67 | 5.67 | 5.64 | 5.64 |
| Nisin Concentration (U/g) | 340 | 325 | 325 | 300 | 300 | 300 | 300 | 300 | 290 |
| Aerobic background (CFU/g) | 60* | 120* | 90** | 500** | 30** | 300** | 10** | <10 | 20** |
| Inoculum Counts (CFU/g) | | | | | | | | | |
| Uninoculated | <10 | NT | NT | NT | NT | NT | NT | NT | NT |
| Nonproteolytic Inoculated | 180 | NT | NT | NT | NT | NT | NT | NT | NT |
| Proteolytic inoculated | 190 | NT | NT | NT | NT | NT | NT | NT | NT |
| Mouse bioassay toxin results: | | | | | | | | | |
| Uninoculated | − | − | − | − | − | − | − | − | − |
| Nonproteolytic Inoculated | − | − | − | − | − | − | − | − | − |
| Proteolytic Inoculated | − | − | − | − | − | − | − | − | − |
| Meat-Filled Pasta with Nisin-Containing Cultured Whey (6% filling, 4% dough) | | | | | | | | | |
| Product pH | 5.28 | 5.28 | 5.35 | 5.32 | 5.38 | 5.32 | 5.33 | 5.33 | 5.30 |
| Nisin Concentration (U/g) | 340 | 300 | 300 | 290 | 290 | 290 | 290 | 290 | 290 |
| Aerobic background (CFU/g) | 30* | 40* | 10** | 40** | <10 | 500** | 30* | 100* | 30* |
| Inoculum Counts (CFU/g) | | | | | | | | | |
| Uninoculated | <10 | NT | NT | NT | NT | NT | NT | NT | NT |
| Nonproteolytic Inoculated | 300 | NT | NT | NT | NT | NT | NT | NT | NT |
| Proteolytic inoculated | 160 | NT | NT | NT | NT | NT | NT | NT | NT |
| Mouse bioassay toxin results: | | | | | | | | | |
| Uninoculated | − | − | − | − | − | − | − | − | − |
| Nonproteolytic Inoculated | − | − | − | − | − | − | − | − | − |
| Proteolytic Inoculated | − | − | − | − | − | − | − | − | − |

*Bacillus spp.
**Mixed Flora
NT = Not Tested

The results in Table 4 and Table 5 show that nisin-containing cultured whey of the invention does provide a significant level of product safety and shelf life stability at abusive as well as refrigerated temperature storage conditions.

That which is claimed is:

1. A fully cooked, fully hydrated, stabilized pasta composition comprising cooked pasta prepared from a pasta dough comprising about 55 to about 50 percent high protein wheat flour, about 1 to about 5 percent wheat gluten, 0 to about 20 percent egg product, 0 to about 3 percent dough conditioner, sufficient nisin-containing cultured whey to provide at least about 150 IU nisin/g pasta dough, and sufficient water to provide a total moisture content of about 25 to about 35 percent; wherein the fully cooked, fully hydrated, stabilized pasta composition is shelf stable at refrigeration temperature for at least 120 days; and wherein the fully cooked, fully hydrated, stabilized pasta composition is of the warm and serve variety.

2. The fully cooked, fully hydrated, stabilized pasta composition of claim 1, wherein the pasta dough comprises about 60 to about 70 percent high protein wheat flour, about 1 to about 4 percent wheat gluten, 0 to about 20 percent egg product, 0 to about 2 percent dough conditioner, sufficient nisin-containing cultured whey to provide about 200 to about 1200 IU nisin/g pasta dough, and sufficient water to provide a total moisture content of about 25 to about 35 percent.

3. The fully cooked, fully hydrated, stabilized pasta composition of claim 2, wherein the pasta dough comprises about 62 to about 68 percent high protein wheat flour, about 2 to about 3.5 percent wheat gluten, 8 to about 12 percent egg product, about 0.01 to about 1 percent dough conditioner, sufficient nisin-containing cultured whey to provide about 300 to about 700 IU nisin/g pasta dough, and sufficient water to provide a total moisture content of about 28 to about 32 percent.

4. The fully cooked, fully hydrated, stabilized pasta composition of claim 1 further comprising a pasta filling or a pasta sauce, wherein the pasta filling or pasta sauce is stabilized using the same nisin-containing whey used to prepare the pasta composition or a second nisin-containing cultured whey.

5. The fully cooked, fully hydrated, stabilized pasta composition of claim 2 further comprising a pasta filling or a pasta sauce, wherein the pasta filling or pasta sauce is stabilized using the same nisin-containing whey used to prepare the pasta composition or a second nisin-containing cultured whey.

6. The fully cooked, fully hydrated, stabilized pasta composition of claim 3 further comprising a pasta filling or a pasta sauce, wherein the pasta filling or pasta sauce is stabilized using the same nisin-containing whey used to prepare the pasta composition or a second nisin-containing cultured whey.

7. The fully cooked, fully hydrated, stabilized pasta composition of claim 1, wherein the nisin-containing cultured whey is prepared by a process comprising:

(i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing cultured whey.

8. The fully cooked, fully hydrated, stabilized pasta composition of claim 3, wherein the nisin-containing cultured whey is prepared by a process comprising:

(i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing cultured whey.

9. The fully cooked, fully hydrated, stabilized pasta composition of claim 1, wherein the nisin-containing cultured whey is prepared by a process comprising:

(i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing cultured whey.

10. The fully cooked, fully hydrated, stabilized pasta composition of claim 3, wherein the nisin-containing cultured whey is prepared by a process comprising:

(i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing cultured whey.

11. A method of making a fully cooked, fully hydrated, stabilized pasta composition, said method comprising the steps of (i) preparing a pasta dough comprising about 55 to about 80 percent high protein wheat flour, about 1 to about 5 percent wheat gluten, 0 to about 20 percent egg product, 0 to about 3 percent dough conditioner, sufficient nisin-containing cultured whey to provide at least about 150 IU nisin/g pasta dough, and sufficient water to provide a total moisture content of about 25 to about 35 percent; and (ii) cooking the pasta dough to form the fully cooked, fully hydrated, stabilized pasta composition;

wherein the fully cooked, fully hydrated, stabilized pasta composition is shelf stable at refrigeration temperature for at least 120 days; and wherein the fully cooked, fully hydrated, stabilized pasta composition is of the warm and serve variety.

12. The method of claim 11, wherein the pasta dough comprises about 60 to about 70 percent high protein wheat flour, about 1 to about 4 percent wheat gluten, 0 to about 20 percent egg product, 0 to about 2 percent dough conditioner, sufficient nisin-containing cultured whey to provide about 200 to about 1200 IU nisin/g pasta dough, and sufficient water to provide a total moisture content of about 25 to about 35 percent.

13. The method of claim 12, wherein the pasta dough comprises about 62 to about 68 percent high protein wheat flour, about 2 to about 3.5 percent wheat gluten, 8 to about 12 percent egg product, about 0.01 to about 1 percent dough conditioner, sufficient nisin-containing cultured whey to provide about 300 to about 700 IU nisin/g pasta dough, and sufficient water to provide a total moisture content of about 28 to about 32 percent.

14. The method of claim 11, wherein the fully cooked, fully hydrated, stabilized pasta composition further comprises a pasta filling or a pasta sauce and wherein the pasta filling or pasta sauce is stabilized using the same nisin-containing whey used to prepare the pasta composition or a second nisin-containing cultured whey.

15. The method of claim 12, wherein the fully cooked, fully hydrated, stabilized pasta composition further comprises a pasta filling or a pasta sauce and wherein the pasta filling or pasta sauce is stabilized using the same nisin-containing whey used to prepare the pasta composition or a second nisin-containing cultured whey.

16. The method of claim 13, wherein the fully cooked, fully hydrated, stabilized pasta composition further comprises a pasta filling or a pasta sauce and wherein the pasta filling or pasta sauce is stabilized using the same nisin-containing whey used to prepare the pasta composition or a second nisin-containing cultured whey.

17. The method of claim 11, wherein the nisin-containing cultured whey is prepared by a process comprising:

(i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing cultured whey.

18. The method of claim 13, wherein the nisin-containing cultured whey is prepared by a process comprising:

(i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing cultured whey.

19. The method of claim 11, wherein the nisin-containing cultured whey is prepared by a process comprising:

(i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing cultured whey.

20. The method of claim 13, wherein the nisin-containing cultured whey is prepared by a process comprising:

(i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing cultured whey.

21. A method of inhibiting the growth of pathogenic microorganisms in a fully cooked, fully hydrated, stabilized pasta composition, said method comprising:

(i) preparing a pasta dough comprising about 55 to about 80 percent high protein wheat flour, about 1 to about 5 percent wheat gluten, 0 to about 20 percent egg product, 0 to about 3 percent dough conditioner, sufficient nisin-containing cultured whey to provide at least about 150 IU nisin/g pasta dough, and sufficient water to provide a total moisture content of about 25 to about 35 percent; and (ii) cooking the pasta dough to form the fully cooked, fully hydrated, stabilized pasta composition;

wherein the amount of nisin-containing cultured whey in the pasta dough is effective to inhibit the growth of pathogenic microorganisms, wherein the fully cooked, fully hydrated, stabilized pasta composition is shelf stable at refrigeration temperature for at least 120 days; and wherein the fully cooked, fully hydrated, stabilized pasta composition is of the warm and serve variety.

22. The method of claim 21, wherein the pasta dough comprises about 60 to about 70 percent high protein wheat flour, about 1 to about 4 percent wheat gluten, 0 to about 20 percent egg product, 0 to about 2 percent dough conditioner, sufficient nisin-containing cultured whey to provide about 200 to about 1200 IU nisin/g pasta dough, and sufficient water to provide a total moisture content of about 25 to about 35 percent.

23. The method of claim 22, wherein the pasta dough comprises about 62 to about 68 percent high protein wheat flour, about 2 to about 3.5 percent wheat gluten, 8 to about 12 percent egg product, about 0.01 to about 1 percent dough conditioner, sufficient nisin-containing cultured whey to provide about 300 to about 700 IU nisin/g pasta dough, and sufficient water to provide a total moisture content of about 28 to about 32 percent.

24. The method of claim 21, wherein the fully cooked, fully hydrated, stabilized pasta composition further comprises a pasta filling or a pasta sauce and wherein the pasta filling or pasta sauce is stabilized using the same nisin-containing whey used to prepare the pasta composition or a second nisin-containing cultured whey.

25. The method of claim 22, wherein the fully cooked, fully hydrated, stabilized pasta composition further comprises a pasta filling or a pasta sauce and wherein the pasta filling or pasta sauce is stabilized using the same nisin-containing whey used to prepare the pasta composition or a second nisin-containing cultured whey.

26. The method of claim 23, wherein the fully cooked, fully hydrated, stabilized pasta composition further comprises a pasta filling or a pasta sauce and wherein the pasta filling or pasta sauce is stabilized using the same nisin-containing whey used to prepare the pasta composition or a second nisin-containing cultured whey.

27. The method of claim 21, wherein the nisin-containing cultured whey is prepared by a process comprising:

(i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing cultured whey.

28. The method of claim 23, wherein the nisin-containing cultured whey is prepared by a process comprising:

(i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing cultured whey.

29. The method of claim 21, wherein the nisin-containing cultured whey is prepared by a process comprising:

(i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing cultured whey.

30. The method of claim 23, wherein the nisin-containing cultured whey is prepared by a process comprising:

(i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing cultured whey.

* * * * *

UNITED STATES PATENT AND TRADEMARK OFFICE
CERTIFICATE OF CORRECTION

PATENT NO.    : 6,797,308 B2
DATED         : September 28, 2004
INVENTOR(S)   : Pasch et al.

It is certified that error appears in the above-identified patent and that said Letters Patent is hereby corrected as shown below:

<u>Column 17,</u>
Line 47, change "50", to -- 80 --.

Signed and Sealed this

Nineteenth Day of April, 2005

JON W. DUDAS
*Director of the United States Patent and Trademark Office*